United States Patent [19]

Tsuboi

[11] Patent Number: 4,515,038
[45] Date of Patent: May 7, 1985

[54] POWER TRANSMISSION MECHANISM FOR MOTORCYCLES

[75] Inventor: Masaharu Tsuboi, Saitama, Japan

[73] Assignee: Honda Giken Kogyo Kabushiki Kaisha, Tokyo, Japan

[21] Appl. No.: 360,881

[22] Filed: Mar. 22, 1982

[30] Foreign Application Priority Data

| Mar. 25, 1981 | [JP] | Japan | 56-43403 |
| Mar. 30, 1981 | [JP] | Japan | 56-46676 |
| Mar. 30, 1981 | [JP] | Japan | 56-46677 |
| Apr. 2, 1981 | [JP] | Japan | 56-49843 |

[51] Int. Cl.³ .................... F16H 57/02; B62M 11/10
[52] U.S. Cl. ................................ 74/606 R; 74/333; 180/226; 180/230
[58] Field of Search ............. 74/333, 606 R, 606 A; 180/218, 230, 226

[56] References Cited

U.S. PATENT DOCUMENTS

| 1,291,391 | 1/1919 | Brush | 74/333 X |
| 1,763,713 | 6/1930 | Klausmeyer | 74/333 |
| 2,071,761 | 2/1937 | Nicholson | 180/33 |
| 2,379,021 | 6/1945 | Marchak | 74/333 |
| 3,403,568 | 10/1968 | Holcombe | 74/333 |
| 4,151,761 | 5/1979 | Nishikawa | 74/606 A |
| 4,273,007 | 6/1981 | Sato et al. | 74/606 R |
| 4,309,915 | 1/1982 | Nozawa et al. | 74/606 R X |
| 4,463,823 | 8/1984 | Tsuboi | 74/606 R X |

FOREIGN PATENT DOCUMENTS

| 181518 | 3/1955 | Austria . | |
| 561376 | 11/1931 | Fed. Rep. of Germany . | |
| 53-35860 | 4/1978 | Japan | 74/606 R |
| 132454 | 9/1980 | Japan . | |
| 114676 | 9/1980 | Japan . | |
| 562169 | 6/1944 | United Kingdom . | |
| 735618 | 8/1955 | United Kingdom . | |
| 1227232 | 4/1971 | United Kingdom | 74/606 A |

OTHER PUBLICATIONS

German Publication V74651I/63K.

Primary Examiner—Lawrence J. Staab
Assistant Examiner—Arthur T. Quiray
Attorney, Agent, or Firm—Lyon & Lyon

[57] ABSTRACT

A power transmission mechanism for a motorcycle includes a change speed gear mechanism which includes a driven countershaft having one end projecting out through an opening in a transmission casing. The countershaft has a driving bevel gear formed integrally thereon and meshes with a driven bevel gear enclosed in a final gear case detachably connected to the transmission casing. Removal of the final gear case permits axial removal of the countershaft and its integral bevel gear through the opening, as well as removal of certain of the gear elements in the change speed gear mechanism, which also pass through the opening.

1 Claim, 2 Drawing Figures

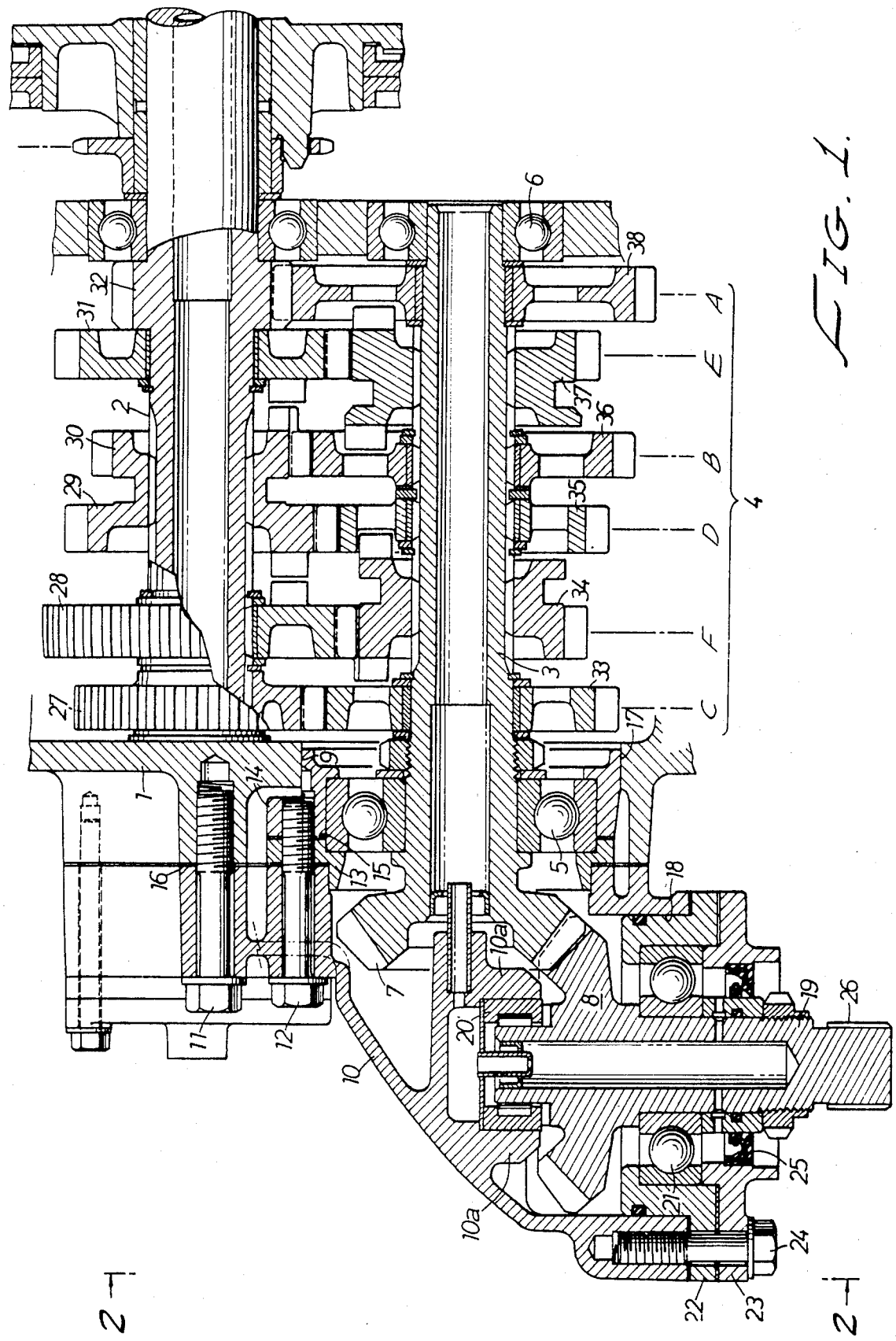

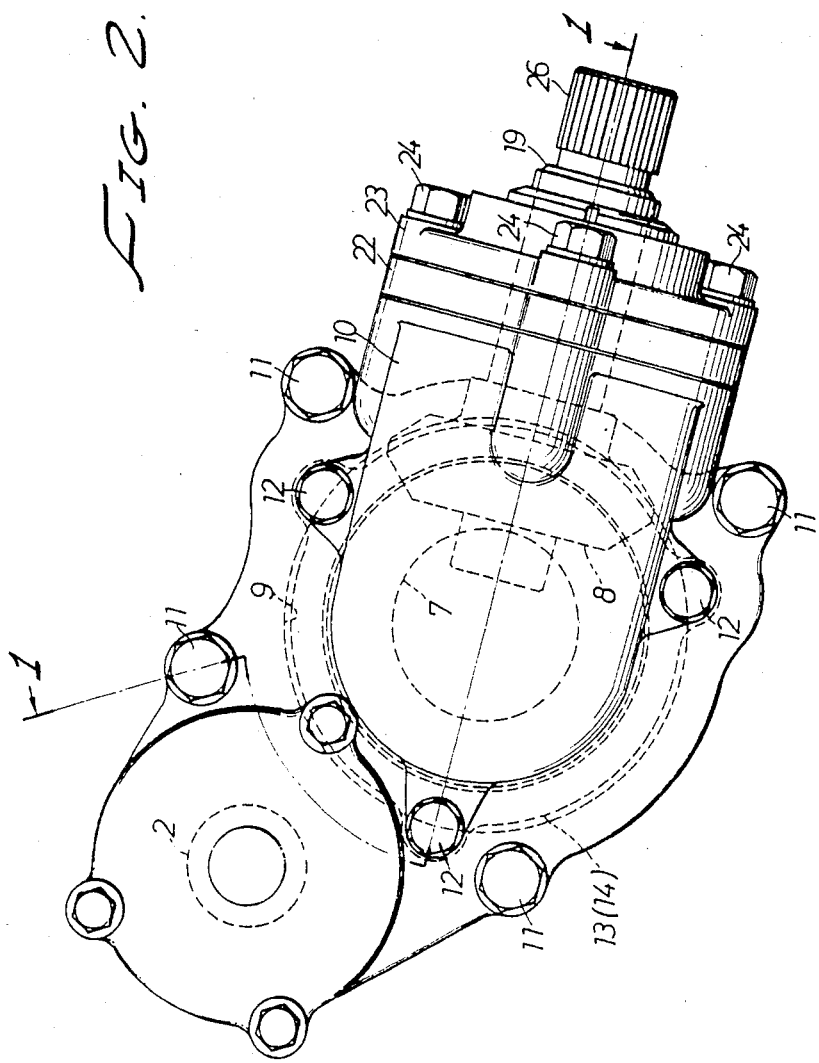

POWER TRANSMISSION MECHANISM FOR MOTORCYCLES

This invention relates to a power transmission mechanism for a shaft drive motorcycle. The mechanism is interposed in the drive train between the engine and the rear wheel.

Prior art shaft drive transmission systems using bevel gears have included an extra shaft which is driven by the countershaft of a change speed gear mechanism, the additional shaft requiring additional supporting bearings. Other prior art shaft drive transmission systems have required that the countershaft and the driven bevel gear be spline-milled. Each of these prior art devices has the disadvantage that the number of parts and the number of working and assembling steps must be reflected in the production cost.

Accordingly, it is an object of the present invention to provide a power transmission mechanism for a shaft drive motorcycle which eliminates the above-mentioned disadvantages.

The present invention finds particular usefulness with an engine having a crankshaft positioned transversely to the running direction of the motorcycle.

Other and more detailed objects and advantages will appear hereinafter.

In the drawings:

FIG. 1 is a sectional elevation taken substantially on the lines 1—1 as shown on FIG. 2.

FIG. 2 is a side elevation taken substantially on the lines 2—2 as shown on FIG. 1.

Referring to the drawings, an engine having a crankshaft mounted transversely of the running direction of the motorcycle is provided with a transmission casing 1 having a main shaft 2 driven by sprocket and having a parallel countershaft 3. These shafts form part of a change speed gear transmission 4, so that the countershaft 3 may be driven at any one of a plurality of speed ratios from the main shaft 2. The individual gear drives are described below.

The countershaft 3 is rotatably supported in the transmission casing 1 by means of axially spaced ball bearings 5 and 6. A driving bevel gear 7 is integrally fixed on an end portion of the countershaft 3 which projects through a cylindrical opening 9 provided in a wall of the transmission casing 1. A driven bevel gear 8 meshes with the driving bevel gear 7.

A final gear case 10 is fixed to said end wall of the transmission casing 1 by means of a plurality of mounting bolts 11, and covers the opening 9. Additional bolts 12 are mounted on the final gear case 10 and project into threaded openings in the first holder 14 for the bearing 5 and the second holder 13 which also contacts the bearing 5. The bearing 5 is thus fitted on and supported by the inner circumferences of the bearing holders 13 and 14. A gasket 15 is provided between the bearing holders 13 and 14, and a shim 16 is located between the second bearing holder 13 and the final gear case 10. The first bearing holder 14 has one side formed with a cylindrical fitting surface 17, which is removably received in the opening 9. As a result, if the casing mounting bolts 11 are removed, the final gear case 10 can be disassembled from the transmission casing 1, the bearing holders 13 and 14 remaining attached to the final gear case 10 by the bolts 12. The bearing 5, countershaft 3, and integral driving bevel gear 7 are all axially removed as a unit with the final gear case 10.

The final gear case 10 has an end wall provided with an opening 18, through which the final shaft 19 is inserted into the final gear case 10 and is carried by the needle bearing 20 and the ball bearing 21. The needle bearing 20 is fitted in and supported by a bearing holder portion 10a formed in the final gear case 10. The ball bearing 21 is fitted in and supported by a bearing holder 22 which is fixed together with a case cover 23 to the end face of the final gear case 10 by means of a plurality of cover mounting bolts 24. The final shaft 19 has its inner end formed integrally with the driven bevel gear 8, which meshes with the driving bevel gear 7, so that power from the countershaft 3 is transmitted to the final shaft 19. The clearance between the opening 18 in the final gear case 10 and the final shaft 19 is closed by the seal assembly 25. A power transmitting spline 26 is formed on the projecting end of the final shaft 19, for cooperation with mechanism (not shown) for driving the rear wheel of the motorcycle.

In the change speed gear mechanism 4 there is shown the gearing for selectively driving the countershaft 3 from the main shaft 2. Gears 27 and 28 are fixed to the main shaft 2, gears 29 and 30 are splined with respect to the main shaft 2, gear 31 rotates on the main shaft 2, and gear 32 is formed integrally with the main shaft 2. With respect to countershaft 3, gears 33, 35, 36 and 38 rotate with respect thereto, while gears 34 and 37 have a splined connection with respect thereto. Selective axial shifting of the splined gears on the two shafts makes possible the six drive ratios indicated by the letters A, B, C, D, E and F shown in FIG. 1.

Moreover, the driven gears 33, 34 and 35 which are supported by the left hand portion of the countershaft 3, as shown in FIG. 1, all have smaller diameters than the diameter of the opening 9 on the outer side wall of the transmission casing 1. In this way these gears can be inserted into and withdrawn out of the transmission casing 1 through the opening 9, while being supported by the countershaft 3.

The present invention makes it possible to reduce the number of parts required to simplify the construction, and to reduce the number of working and assembling steps, resulting in a compact transmission mechanism in which the cost of production is lowered.

Having fully described my invention, it is to be understood that I am not to be limited to the details herein set forth but that my invention is of the full scope of the appended claims.

I claim:

1. A power transmission mechanism for a motorcycle, comprising a transmission casing having a wall provided with an opening therethrough;

a change speed gear mechanism mounted in said transmission casing and including a countershaft having one end projecting out of said transmission casing through said opening;

a driving bevel gear formed integrally on the projecting end of said countershaft;

a final gear case including fasteners detachably fixing said final gear case to said transmission casing;

axially spaced bearings supporting said countershaft within said transmission casing;

a first bearing holder mounted in said opening and secured to said final gear case and engaging one of said bearings;

a second bearing holder engaging the same bearing and carried by said final gear case;

a final shaft rotatably mounted in said final gear case and having a driven bevel gear integrally formed therewith and meshing with said driving bevel gear;

a final shaft bearing mounted within said final gear case;

said final gear case, said bearing holders, said driving bevel gear, said countershaft, said driven bevel gear, said final shaft and a plurality of the gears on said countershaft of said change speed gear mechanism being separable from said transmission casing as a unit with release of said fasteners.

* * * * *